United States Patent
Pritchard et al.

(10) Patent No.: US 7,149,827 B1
(45) Date of Patent: Dec. 12, 2006

(54) METHODS AND APPARATUS FOR TRISTATE LINE SHARING

(75) Inventors: J. Orion Pritchard, Santa Cruz, CA (US); Todd Wayne, Soquel, CA (US)

(73) Assignee: Altera Corporation, San Jose, CA (US)

( * ) Notice: Subject to any disclaimer, the term of this patent is extended or adjusted under 35 U.S.C. 154(b) by 335 days.

(21) Appl. No.: 10/775,994

(22) Filed: Feb. 9, 2004

(51) Int. Cl.
*G06F 13/00* (2006.01)
*G06F 12/00* (2006.01)
*G06F 12/06* (2006.01)

(52) U.S. Cl. .............................. 710/100; 711/1; 711/5
(58) Field of Classification Search .................... None
See application file for complete search history.

(56) References Cited

U.S. PATENT DOCUMENTS

| | | | |
|---|---|---|---|
| 4,644,494 A * | 2/1987 | Muller | 711/152 |
| 5,623,645 A * | 4/1997 | Yip et al. | 713/400 |
| 5,875,470 A * | 2/1999 | Dreibelbis et al. | 711/147 |
| 6,801,459 B1 * | 10/2004 | Riesenman et al. | 365/189.01 |
| 6,836,815 B1 * | 12/2004 | Purcell et al. | 710/317 |
| 2004/0199741 A1 * | 10/2004 | Floman | 711/170 |

OTHER PUBLICATIONS

Kenneth D. Wagner, "Robust Scan-Based Logic Test in VDSM Technologies", IEEE 0018-9162/99, pp. 66-74, Nov. 1999.

* cited by examiner

*Primary Examiner*—Rehana Perveen
*Assistant Examiner*—Jeremy S. Cerullo
(74) *Attorney, Agent, or Firm*—Beyer Weaver & Thomas, LLP (57) ABSTRACT

Methods and apparatus are provided for interconnecting on-chip components, such as components on a programmable chip, with off-chip components through a variety of buses, fabrics, and input/output lines. Interconnection resources such as input/output lines are shared for communication with different off-chip components such as memory. Control circuitry and an arbitration fabric are provided to further improve communication efficiency between on-chip and off-chip components.

30 Claims, 9 Drawing Sheets

Figure 9 ized chip to allow communication with off-chip components, but techniques for integrating off-chip components with on-chip components are limited.

METHODS AND APPARATUS FOR TRISTATE LINE SHARING

BACKGROUND OF THE INVENTION

1. Field of the Invention

The present invention relates to a system on a programmable chip. More specifically, the present invention relates to methods and apparatus for a memory controller to share I/O lines associated with a system on a programmable chip.

2. Description of Related Art

Conventional programmable chip systems often include a variety of components on-chip. Integrating a variety of peripheral interfaces and peripheral components on-chip allows efficient implementation of a programmable chip system. However, it is also often desirable to also use off-chip components. Some off-chip components such as memory are inexpensive and readily available and can be used to supplement on-chip components. In some examples, separate independent buses are used to control off-chip components. Each bus could be connected to a different type of memory through a peripheral interface.

However, techniques and mechanisms for integrating off-chip components with on-chip components are limited. For programmable chips interconnected with a large number of off-chip components, conventional interconnection mechanisms are often inadequate.

Consequently, it is therefore desirable to provide improved methods and apparatus for interconnecting on-chip components such as components on a programmable chip to off-chip component such as memory. In one example, it is desirable to provide logic and circuitry to interconnect system on a programmable chip components such buses and input/output lines with a variety of different off-chip components.

SUMMARY OF THE INVENTION

Methods and apparatus are provided for interconnecting on-chip components, such as components on a programmable chip, with off-chip components through a variety of buses, fabrics, and input/output lines. Interconnection resources such as input/output lines are shared for communication with different off-chip components such as memory. Control circuitry and an arbitration fabric are provided to further improve communication efficiency between on-chip and off-chip components.

In one embodiment, a system on a programmable chip is provided. The system includes a processor core and a memory controller coupled to the processor core. The memory controller has a plurality of I/O lines including data, address, and control lines. The I/O lines are operable to allow the processor to access off-chip tristate devices. The memory controller is user configurable to either use separate sets of I/O lines for accessing off-chip tristate devices or to share one or more I/O lines for accessing off-chip tristate devices.

In another embodiment, a method for configuring a programmable chip is provided. Information identifying a memory controller is received. The memory controller is associated with a processor core. A plurality of off-chip tristate devices are identified. User configuration information is received through an interface to use separate sets of I/O lines or to share one or more I/O lines for accessing the off-chip tristate devices. The plurality of I/O lines including data, address, and control lines are generated to couple the memory controller with the plurality of off-chip tristate devices.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

DETAILED DESCRIPTION OF SPECIFIC EMBODIMENTS

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. For example, the techniques of the present invention will be described in the context of particular memory controllers.

However, it should be noted that the techniques of the present invention can be applied to a variety of types of devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Programmable chips and particularly systems on programmable chips include many components on-chip, but also often use a variety of off-chip components. In many examples, peripheral interfaces are included on a programmable chip to allow interaction with off-chip components. For programmable chips interconnected with a larger number of off-chip components, the number of I/O lines or I/O pins is often a limiting factor. For example, systems that have external flash memory and SDRAM normally use independent buses to control the devices. The independent buses use well over 100 I/O lines or I/O device pins.

Figure 1:
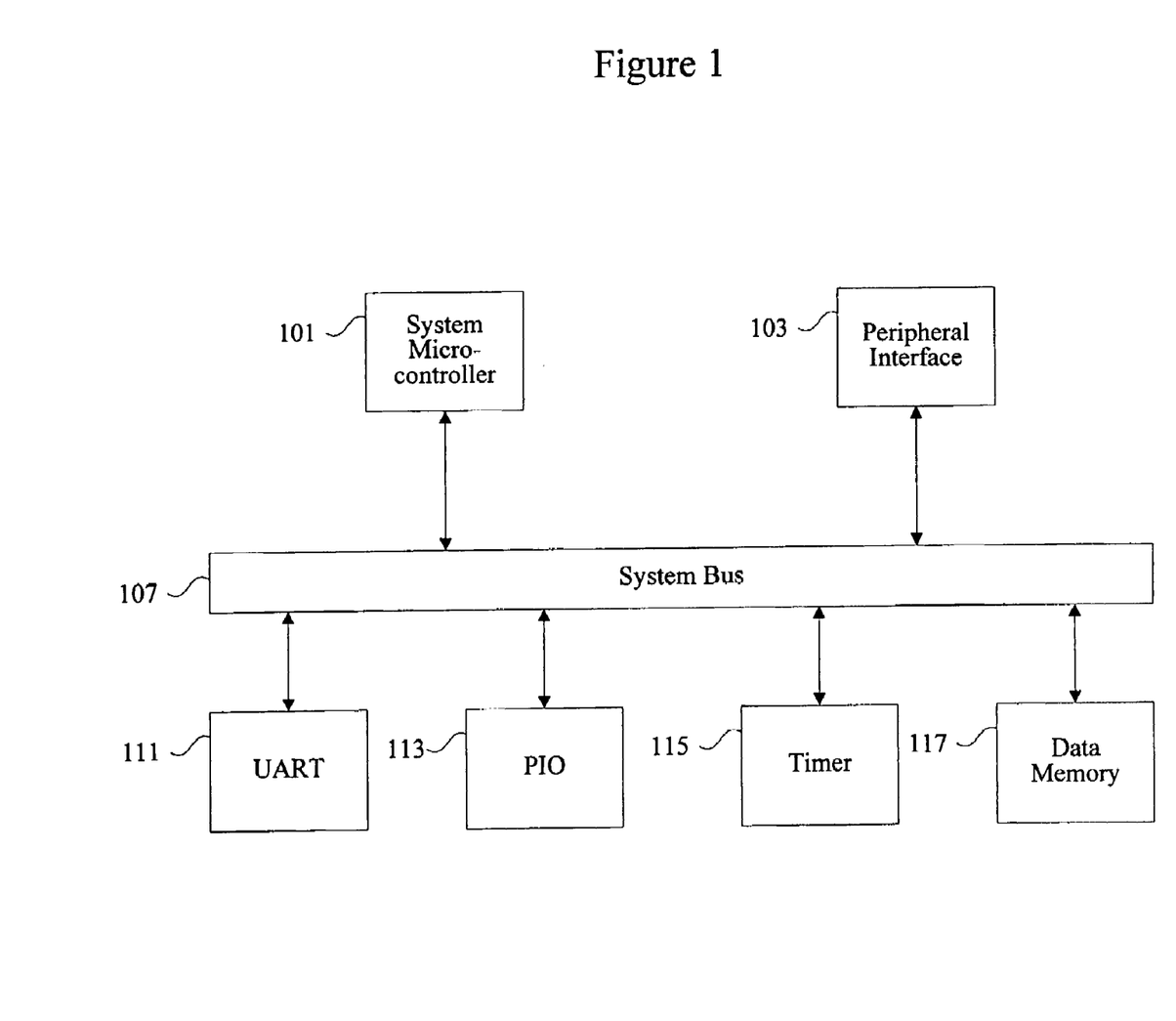
FIG. 1 is a diagrammatic representation showing a system with a memory controller.

FIG. 1 is a diagrammatic representation showing a system on a programmable chip having a processor core, peripheral devices, and peripheral interfaces. The system on a programmable chip includes processor core 101 and a peripheral interface 103 as well as peripheral components UART 111, PIO 113, timer 115, and data memory 117. In some examples, the peripheral interface 103 is a memory controller with an associated bus bridge. It should be noted that the system can include both on-chip and off-chip memory.

The programmable chip uses different types of resources that can be interchangeably used in different allocations to implement the system on a programmable chip. In one example, the programmable chip uses logic elements for implementing each of the various components on the programmable chip.

Logic elements typically can be implemented using components such as antifuses, static RAM, and EPROMS. Any mechanism on a programmable chip that performs an operation on a given number of input lines to provide one or more outputs based on information programmed is herein referred to as a logic element. Some logic elements are implemented as combinations of look up tables and switches for performing Boolean operations on input lines. In one example, a logic element includes a 16-bit SRAM lookup table (LUT) that can implement an arbitrary 4-input logic function, circuitry that forms a fast carry chain and a fast cascade chain, a register and preset/reset logic for the register.

As noted above, the programmable chip can also include on-chip memory as well as interfaces to off-chip components such as off-chip memory. The peripheral interfaces such as peripheral interface 103 use I/O pins or I/O lines to allow off-chip components to interact with components on the programmable chip coupled to an on-chip bus or on-chip fabric.

Figure 2:
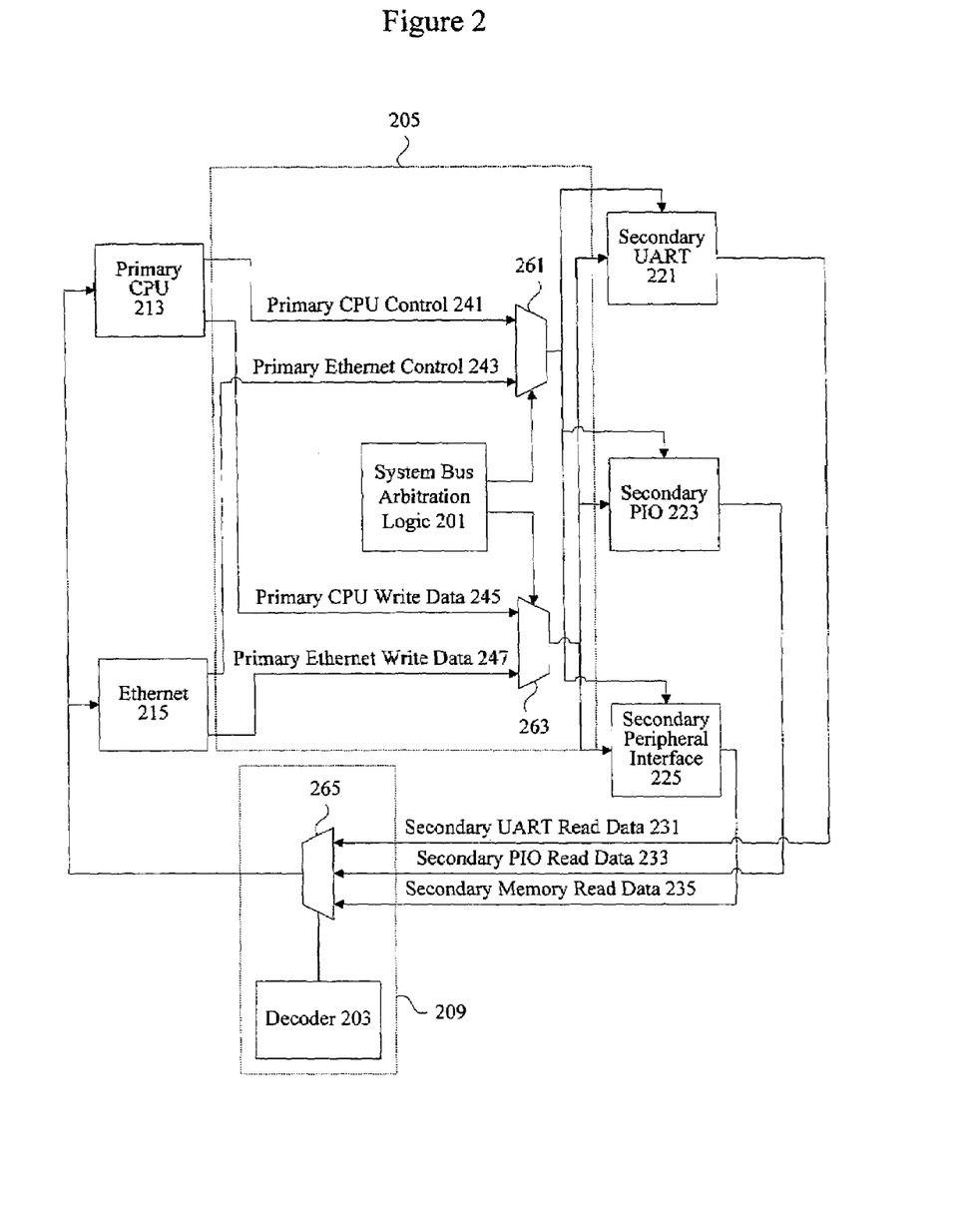
FIG. 2 is a diagrammatic representation showing a system using a conventional bus.

A variety of on-chip component bus and fabric configurations are available. FIG. 2 is a diagrammatic representation depicting a peripheral interface such as a memory controller coupled to a microprocessor in a system using a conventional bus architecture. The techniques and mechanisms of the present invention recognize that an efficient peripheral interface can be implemented in a system using a conventional bus architecture, even though such an architecture is not ideal. For example, a conventional bus architecture would have many primary components competing for on-chip bus resources in addition to peripheral interfaces competing of I/O pin and I/O line resources. The lack of bus resources may make it difficult for a peripheral interface to read and write to an off-chip component such as an SRAM or an SDRAM in an efficient manner.

A conventional bus architecture includes a system bus arbitrator 205. A system bus arbitrator 205 includes arbitrator switching circuitry 261 and 263 as well as system bus arbitration logic 201. Logic and mechanisms for selecting an input based on a control signal are referred to herein as arbitrator switching circuitry. It should be noted that although switching circuitry generally can be implemented using multiplexers, a variety of mechanisms including switches and transistors can be used.

Any component or device that is operable to initiate read and write operations by providing control information is referred to herein as a primary component. Primary components are sometimes referred to as master components. Control information can include a particular address associated with a secondary component. Any component or device that responds to read or write operations with information sent back to the primary component regarding the read or write operation is referred to herein as a secondary component. Secondary components are sometimes referred to as slave components. Some examples of primary components are processors, microcontrollers, and Ethernet devices. Some examples of secondary components are Universal Asynchronous Receiver Transmitters (UARTs), Parallel Input Output (PIO), program memory, and data memory. It should be noted that some components such as an Ethernet component can be both a primary component and a secondary component, as an Ethernet component has the capability of reading and writing to the secondary program memory while also responding to instructions from primary system CPU. Similarly, a component such as a streaming output generator can also be both a primary and a secondary component, as it can read memory while receiving requests from a microcontroller.

Logic and mechanisms for providing the control signal based on criteria such as fairness or priority are referred to herein as arbitration logic. The inputs of the arbitrator switching circuitry 261 and 263 are connected to primary CPU 213 and primary Ethernet 215. The outputs of the arbitrator switching circuitry 261 and 263 are connected to secondary UART 221, secondary PIO 223, and secondary peripheral interface 225. The outputs of the secondary components transmit information such as read data back to the primary components through a decoder 209. Mechanisms for selecting secondary components and translating control information such as addresses is referred to herein as a decoder. In conventional computer systems, there is a single decoder for each bus. A decoder 209 includes decoder logic 203 and decoder switching circuitry 265 for selecting the particular secondary component data transfer. A decoder can also be referred to as a primary side arbitrator including primary side arbitration logic and primary side switching circuitry.

A system bus typically has a set width (e.g. 64 bits, 128 bits) and allows only one primary component to actively use the bus at any one time. In conventional systems, only one primary component can access any one of the given secondary components and any given time. A primary component performing a read or write operation on a secondary component is referred to herein as accessing a secondary component. Multiple primary components accessing secondary components in a manner that would cause data bit collisions if performed on the same data lines is referred to herein as accessing secondary components at the same time.

In one example, an Ethernet device is accessing a secondary PIO. While the Ethernet device is accessing the secondary PIO, a processor can not access an SDRAM through a peripheral interrface even if both the primary streaming output device and the peripheral interface are available.

The system bus arbitration logic 201 determines which primary component has access to the system bus at any time. The system bus arbitrator 201 can determine which primary component can access a secondary component based on criteria such as fairness or priority. Any component or device that is configured to ensure that only one primary component can access any one of the secondary components at any given time is referred to herein as a system bus arbitrator. Various schemes such as weighted fairness can be implemented to improve the efficiency of secondary component access, but such schemes can increase system complexity and latency. In conventional implementations, a computer system includes a single system bus arbitrator for each bus in the computer system.

According to various embodiments of the present invention, it is recognized that a bus is no longer required in certain applications such as system on a chip, system on a programmable chip, and other computer system implementations. A device such as a programmable logic device (PLD) or a field programmable gate array (FPGA) using a hardware descriptor language (HDL) is herein referred to as a programmable chip. Instead of implementing complicated bus sharing schemes using mechanisms such as splitting, the bus itself can be eliminated to improve system performance. According to specific embodiments, it is recognized that primary components and secondary components need not be routed through a construct such as a bus. By not routing signals through a bus, a streaming output device can be implemented in a much more efficient manner. The conventional data and address lines that make up the bus are no longer the resource in contention. Instead, secondary components are resources in contention, as the number of physical lines connected to each secondary component in a system can be fixed.

Consequently, a system bus arbitrator associated with all the secondary components in a computer system is no longer needed. Instead, secondary components themselves that may be accessed by more than one primary component are assigned individual secondary side arbitrators. An arbitrator that corresponds to a specific secondary component accessible by more than one primary component is referred to herein as a secondary side arbitrator. In one embodiment, there is a secondary side arbitrator for each secondary component in a computer system. In other embodiments, there is a secondary side arbitrator for selected secondary components in a system. A component such as a streaming output device can continuously access system memory without preventing a processor from interacting with other devices.

Figure 3:
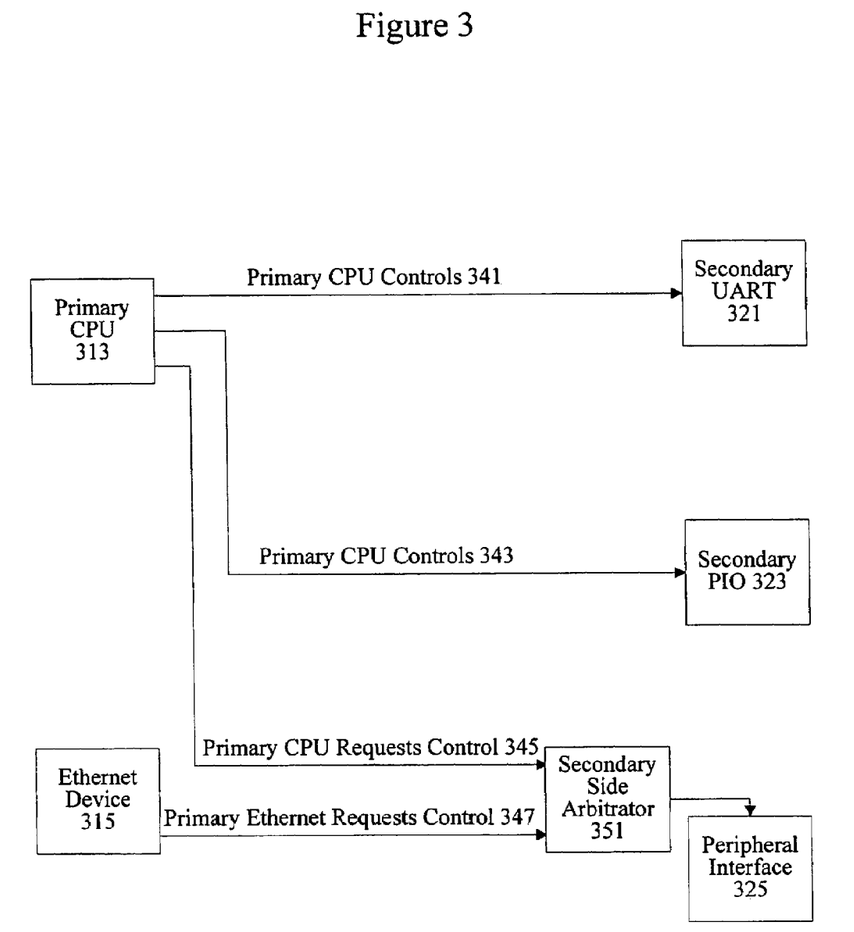
FIG. 3 is a diagrammatic representation showing a system having simultaneous multiple primary components.

FIG. 3 is a diagrammatic representation showing one example of a system using secondary side arbitration, sometimes referred to as slave side arbitration, simultaneous multiple primary components, or simultaneous multiple masters. A system using individual arbitrators that correspond to individual secondary components accessible by more than one primary component is referred to herein as a secondary side arbitration system. The secondary side arbitration system no longer requires a bus or a system bus arbitrator that prevents a second primary component from accessing a second secondary component when a first primary component is accessing a first secondary component. According to various embodiments a secondary component such as peripheral interface 325 is associated with a secondary side arbitrator 351. However, secondary components UART 321 and PIO 323 are not associated with any arbitrator. In one example, secondary component UART 321 and secondary PIO 323 can only be accessed by primary CPU 313 and not by primary Ethernet device 315. A secondary memory component 325, however, can be accessed by both primary CPU 313 and primary Ethernet device 315.

According to various embodiments, a secondary side arbitrator 351 allows a first secondary component in a system to be accessed by a first primary component at the same time a second secondary component in the system is accessed by a second primary component. For example, peripheral interface 325 can be accessed by primary Ethernet 315 through secondary side arbitrator 351 at the same time, secondary UART 321 is accessed by primary CPU 313.

By allowing a CPU to access a secondary component at the same time another primary component such as a streaming output device or an Ethernet component is accessing memory, bus bottlenecks can be reduced.

Bus bottlenecks are reduced using simultaneously primary components. However, I/O pin and I/O line related limitations remain.

Figure 4:
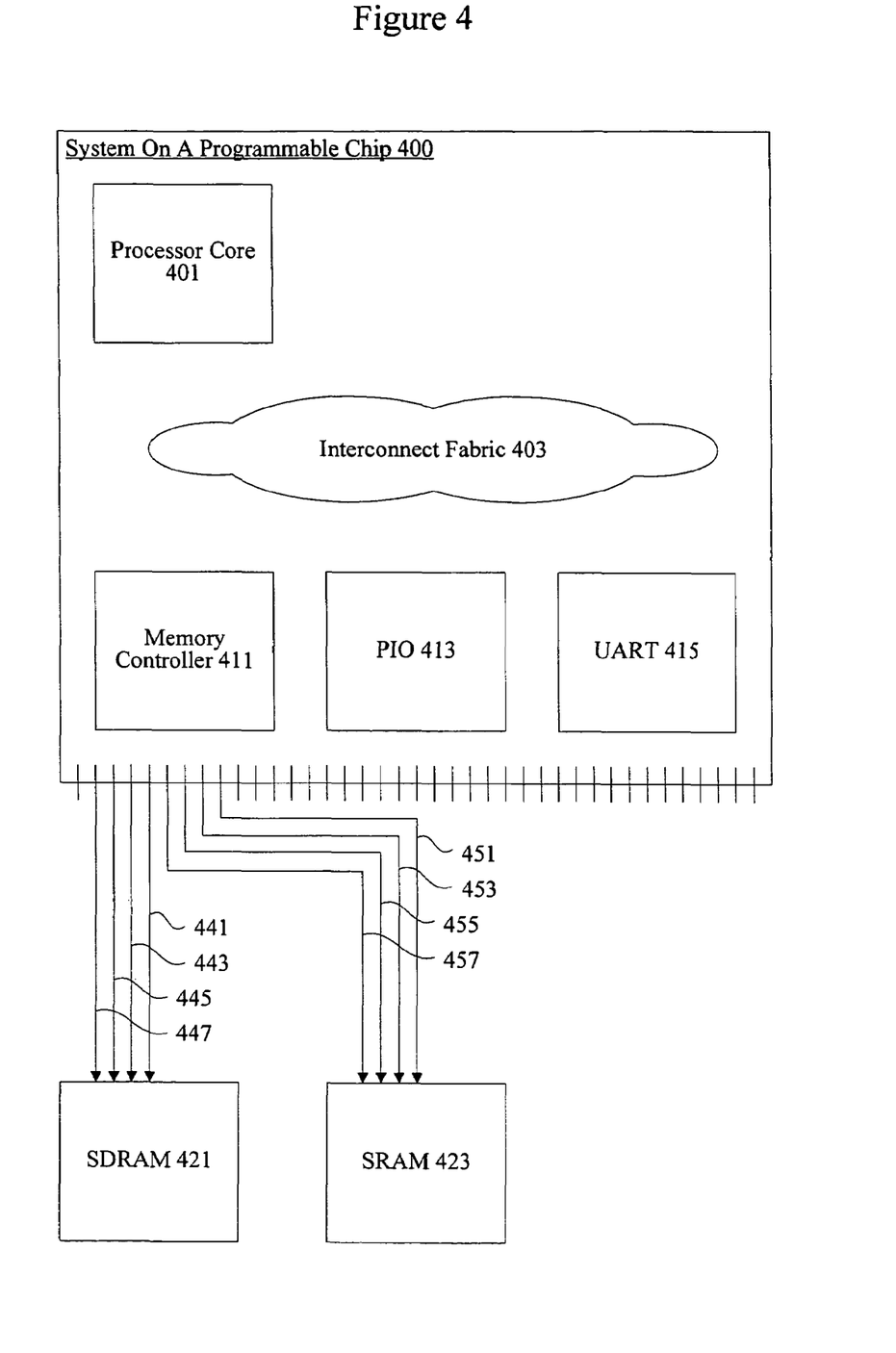
FIG. 4 is a diagrammatic representation showing a system on a programmable chip connected to external tristate devices using separate sets of I/O lines.

FIG. 4 is a diagrammatic representation of one example of a system on a programmable chip 400 having limited I/O pin and I/O line resources. According to various embodiments, the system on a programmable chip 400 includes a processor core as a primary component as well as secondary components PIO 413 and UART 415. In one example, the processor is a state machine. Various components communicate with each other using an interconnect fabric 403. In one embodiment, the interconnect fabric is a bus. In another embodiment, the interconnect fabric is a simultaneous multiple primary component fabric. The system on a programmable chip 400 also includes a memory controller 411. In one embodiment, the memory controller 411 is configured to interact with off-chip memory such as Synchronous Dynamic Random Access Memory (SDRAM) 421.

SDRAM is commonly found in cost-sensitive applications using large amounts of memory. Though SDRAM is inexpensive, the implementation of refresh operations, open row management, and various delays and command sequences uses logic typically supplied by a memory controller. According to various embodiments, the memory controller 411 handles SDRAM initialization, refresh, and other SDRAM specifications and appears to software as a simple linear memory interface (flat address space) with a wait signal. With the SDRAM Controller, users can access SDRAM subsystems with a variety of data widths, memory sizes, and multiple chip selects.

In one embodiment, SDRAM chips are arranged as multiple banks of memory with each bank capable of independent open row address management. The memory controller 411 takes advantage of open row management for a single bank. Systems or applications that frequently change the destination bank for operations use extra management cycles (row closings and openings) to access data. Continuous reads or writes within the same row and bank can operate at rates approaching one word per clock.

Memory controller 411 interacts with SDRAM 421 through control line 447, data line 445, address line 443, and mask line 441. It should be noted that in some examples, well over 100 I/O pins are used in order to interact with the SDRAM 421. Other I/O lines such as lines 451, 453, 455 and 457 are used to control a Synchronous Random Access Memory (SRAM) device 423. Peripheral interfaces such as a memory controller 411 can be used to interact with a variety of off-chip devices including tristate devices. Any component or interface capable of setting one or more lines to a third state in addition to on and off is referred to herein as a tristate device. In one example, the line values of a tristate device can be represented using 0, 1, and 2.

The techniques and mechanisms of the present invention recognized that I/O lines may be limiting resources, particularly when a system on a programmable chip 400 is interconnected with a number of off-chip devices. Consequently, mechanisms are provided to allow a user configure a memory controller to interact with multiple off-chip devices using the same, shared I/O lines. In one example, users may choose to share the tristate data and address buses with other tristate devices. This feature is valuable in systems which have multiple types of external memory devices, but limited I/O pins.

Figure 5:
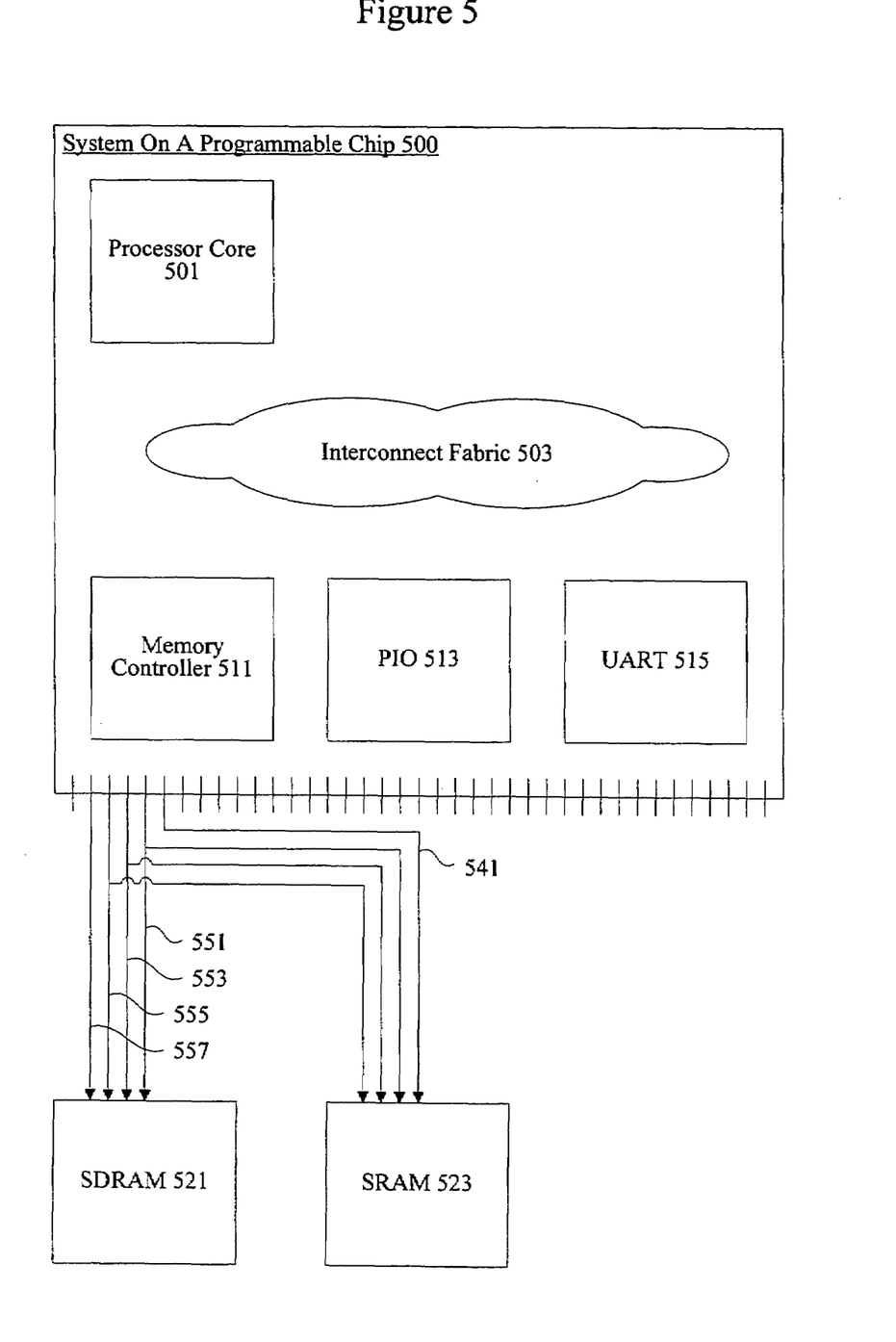
FIG. 5 is a diagrammatic representation showing a system on a programmable chip connected to external tristate devices using some shared I/O lines.

FIG. 5 is a diagrammatic representation of one example of a system on a programmable chip 500 using shared I/O pin and I/O line resources. According to various embodiments, the system on a programmable chip 500 includes a processor core as a primary component as well as secondary components PIO 513 and UART 515. Various components communicate with each other using an interconnect fabric 503. The system on a programmable chip 500 also includes a memory controller 511. In one embodiment, the memory controller 511 is configured to interact with off-chip memory such as SDRAM 521 and SRAM 523 using shared I/O lines and I/O pins.

Memory controller 511 interacts with SDRAM 521 and SRAM 523 using the same set of data 545, address 543, and mask 541 lines. However, different control lines 541 and 557 are used to indicate which device is active for reading and writing data. In some examples, only a subset of lines such as data lines are shared. By sharing address, data, and mask buses, as many more lines (depending on memory widths) are freed for other purposes.

According to various embodiments, lines are shared between tristate memory devices. In some examples, when the controller shares data pins, it automatically maintains control of the associated tristate bus as long as back-to-back read or write transactions within the same row and bank of memory persist. A break in back-to-back transactions, or a refresh transaction, closes a row. This both prevents the controller from blocking access to other tristate devices and prevents the controller from violating row open time limits. Although sharing lines provides a variety of benefits, it does in many instances use more row open and close overhead cycles.

In one embodiment, an indicator such as Is_Shared is used to declare that a port type associated with various pins are shared. A shared port of a given type can be connected to multiple off-chip secondary devices. In one embodiment, the data port is always shared. Other ports can be shared optionally, such as address, read, and write. If one or more other peripherals use a port of the same type and the other peripherals' port is also declared as shared, then the shared ports are multiplexed onto the same device I/O pins.

According to various embodiments, a secondary component only responds to shared signals at specific times. In some embodiments, whether a secondary component responds to shared signals is configured using chip select and output enable signals and indicators. An off-chip secondary peripheral may only accept transfers when its chip select signal or indicator is asserted. According to various embodiments, the chip select signal or indicator is provided on a control line that is not shared.

Figure 6:
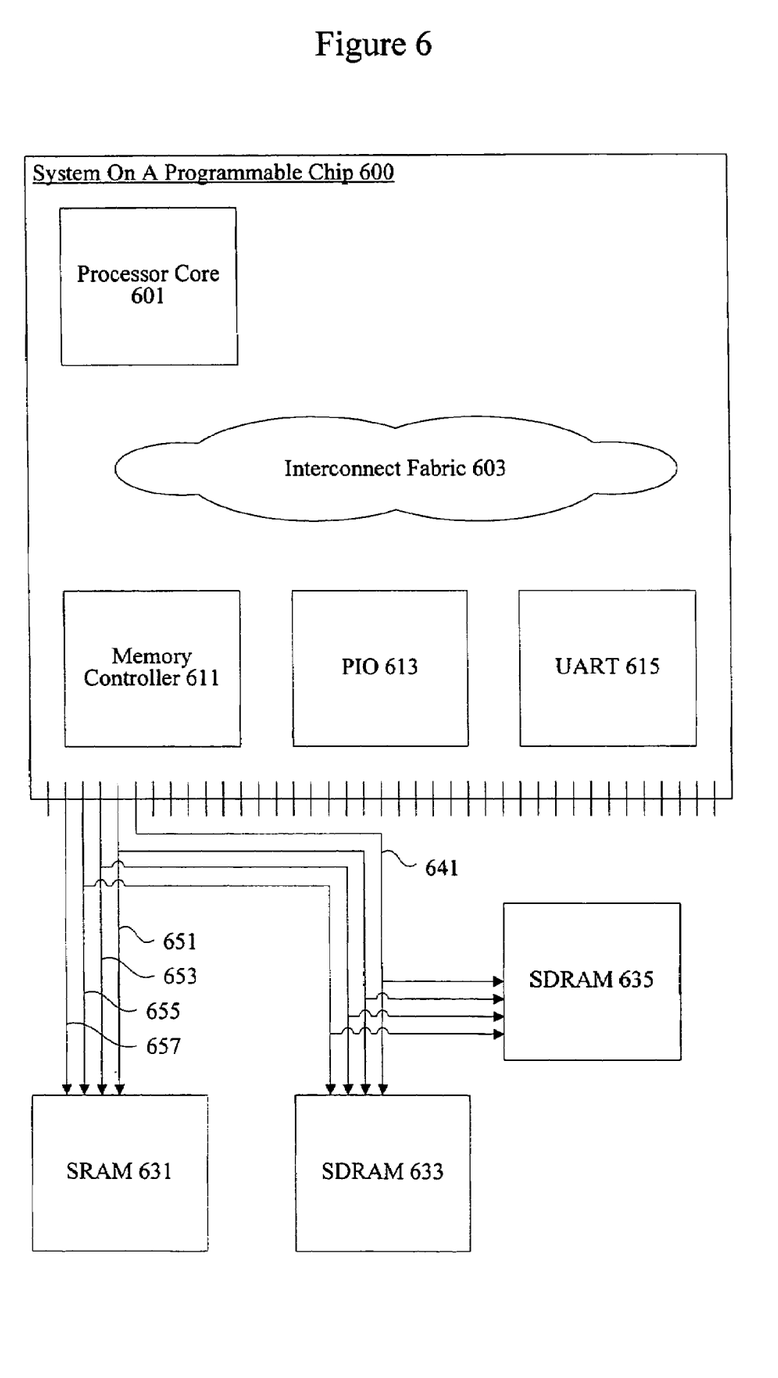
FIG. 6 is a diagrammatic representation showing a system on a programmable chip connected to external tristate devices using some shared I/O lines and multiple SDRAM and SRAM blocks.

Not only can the I/O lines be shared between the different off-chip components, I/O lines can also be shared between the same type of off-chip component. FIG. 6 is a diagrammatic representation showing one example of sharing between both same and different devices.

According to various embodiments, the system on a programmable chip 600 includes a processor core as a primary component as well as secondary components PIO 613 and UART 615. Various components communicate with each other using an interconnect fabric 603. The system on a programmable chip 600 also includes a memory controller 611. In one embodiment, the memory controller 611 is configured to interact with off-chip memory such as SDRAM 633, SDRAM 635, and SRAM 631.

In one example, the two 64 Mb SDRAM chips each with a 16-bit data widths are arranged in parallel to respond to control line 641 and data, address, and mask lines 653, 651, at 655. The SDRAM 633 and SDRAM 635 are provided in parallel to allow the two SDRAM chips each with 16-bit data widths to provide a 32-bit data width memory to a processor core 601. All lines including control lines are shared between the SDRAM 633 and 635. Various I/O lines are also shared with SRAM 631. Lines 651, 653, and 655 remain shared. However, a different control line 657 is used to provide signals such as chip select and output enable signals to the device.

Figure 7:
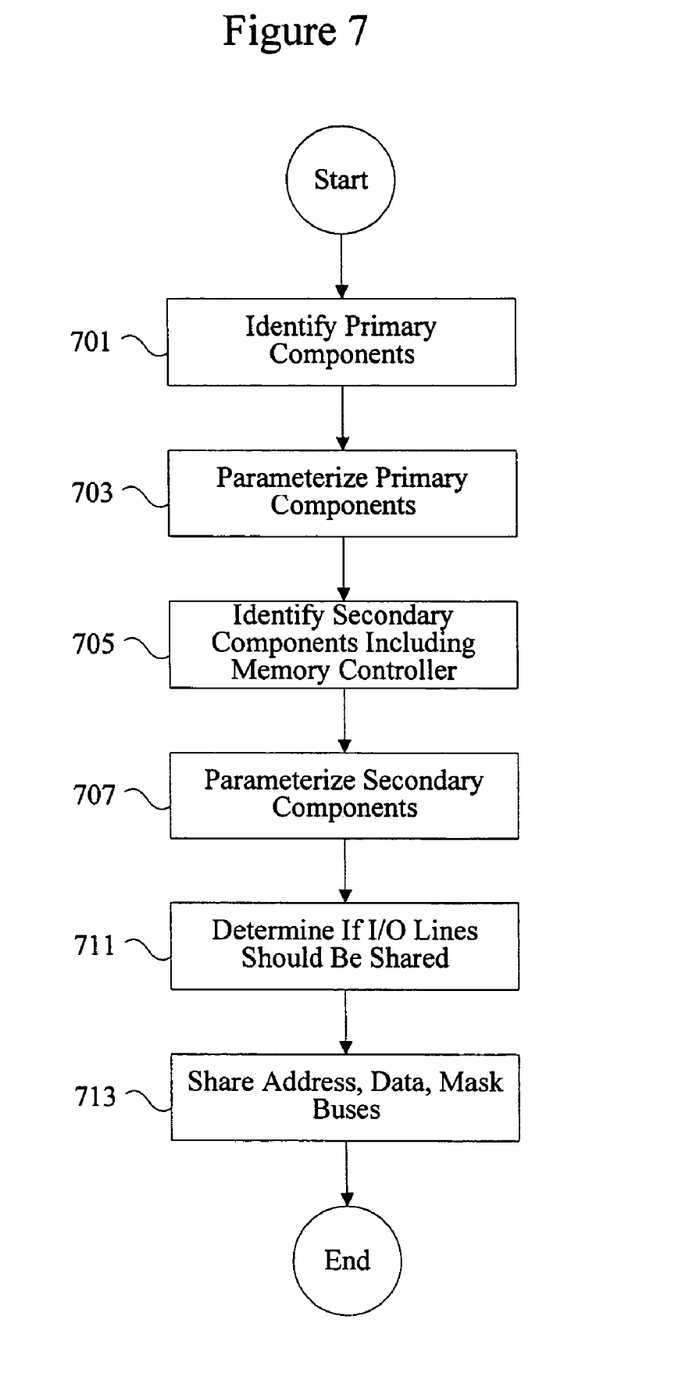
FIG. 7 is a flow process diagram diagrammatic representation showing a technique for configuring shared I/O lines.

FIG. 7 is a flow process diagrams showing one example of a technique for configuring a system on a programmable chip. At 701, primary components such as processor cores, Ethernet components, DMA controllers, etc., are identified for implementation on the programmable device. At 703, primary components are parameterized. In one example, parameterization is optional, but allows processor cores to be more precisely configured for particular applications. In one example, parameterization can include setting the data width of a processor core. At 705, secondary components including a peripheral interfaces such as memory controllers are identified.

According to various embodiments, peripheral interfaces may use a large number of I/O pins and I/O lines to interact with off-chip devices. At 707, secondary components are optionally parameterized. At 711, a user configurable select option is provided to allow I/O lines to be shared between off-chip components. If a user elects to share I/O lines between components, I/O resources are conserved. In some instances, I/O lines are shared if a configuration tool recognizes that a smaller programmable device can be used by sharing I/O lines. However, additional open and close cycles may be needed in order to coordinate between interaction with off-chip devices. At 713, if lines are shared, the same data, address, and mask buses are assigned to different off-chip components.

Figure 8:
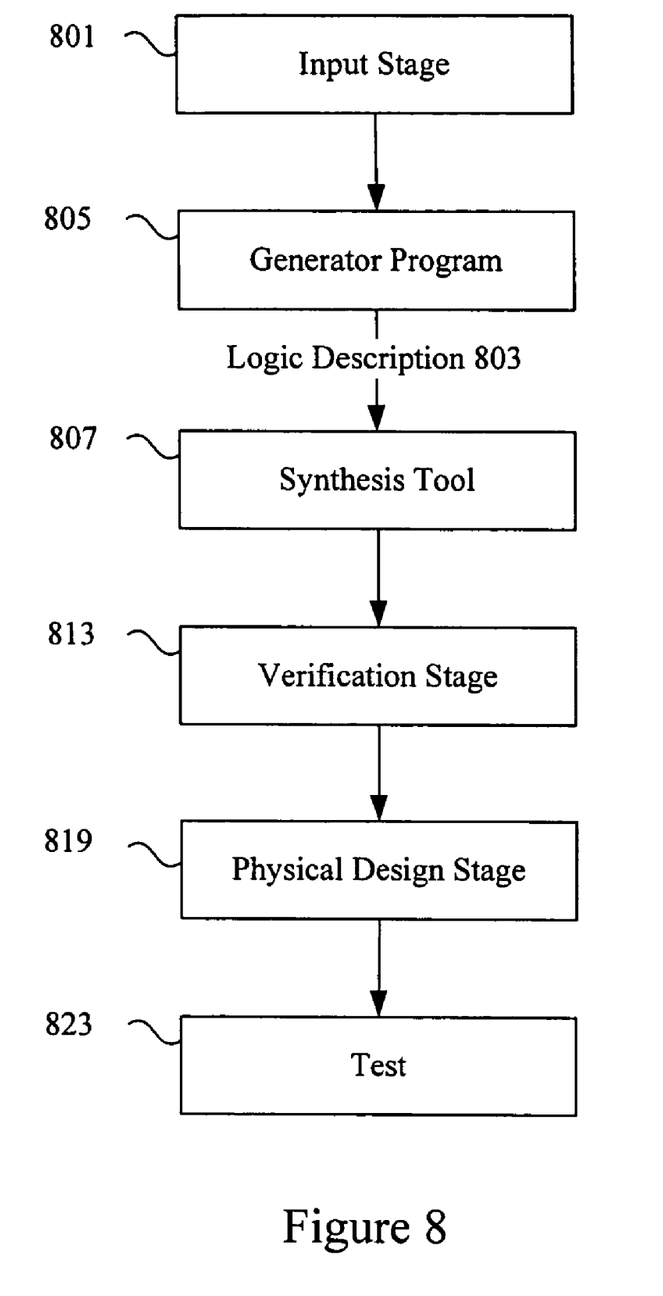
FIG. 8 is a diagrammatic representation showing implementation of a programmable chip.

FIG. 8 is a diagrammatic representation showing implementation of an electronic device that can have shared I/O lines. An input stage 801 receives selection information typically from a user for logic such as a processor core as well as other components such as a streaming output device to be implemented on an electronic device. A generator program 805 creates a logic description and provides the logic description along with other customized logic to any of a variety of synthesis tools, place and route programs, and logic configuration tools to allow a logic description to be implemented on an electronic device.

In one example, an input stage 801 often allows selection and parameterization of components to be used on an electronic device. Selection of share or no share can be made. In some examples, components provided to an input stage include intellectual property functions, megafunctions, and intellectual property cores. The input stage 801 may be a graphical user interface using wizards for allowing efficient or convenient entry of information. The input stage may also be a text interface or a program reading a data file such as a spreadsheet, database table, or schematic to acquire selection information. The input stage 801 produces an output containing information about the various modules selected.

In typical implementations, the generator program 805 can identify the selections and generate a logic description with information for implementing the various modules. The generator program 805 can be a Perl script creating HDL files such as Verilog, Abel, VHDL, and AHDL files from the module information entered by a user. According to various embodiments, the generator program 805 also provides information to a synthesis tool 807 to allow HDL files to be automatically synthesized. In some examples, a logic description is provided directly by a designer. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool 809.

As will be appreciated by one of skill in the art, the input stage 801, generator program 805, and synthesis tool 807 can be separate programs. The interface between the separate programs can be a database file, a log, or simply messages transmitted between the programs. For example, instead of writing a file to storage, the input stage 801 can send messages directly to the generator program 805 to allow the generator program to create a logic description. Similarly, the generator program can provide information directly to the synthesis tool instead of writing HDL files. Similarly, input stage 801, generator program 805, and synthesis tool 807 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 807.

A synthesis tool 807 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 813 typically follows the synthesis stage 807. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 813, the synthesized netlist file can be provided to physical design tools 819 including place and route and configuration tools. A place and route tool typically locates logic cells on specific logic elements of a target hardware device and connects wires between the inputs and outputs of the various logic elements in accordance with logic required to implement an electronic design. The device can also be physically tested at 823.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be tested using various techniques of the present invention.

As noted above, different stages and programs can be integrated in a variety of manners. According to one embodiment, the input stage 801, the generator program 805, the synthesis tool 807, the verification tools 813, and physical design tools 819 are integrated into a single program. The various stages are automatically run and transparent to a user. The program can receive the user selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 9:
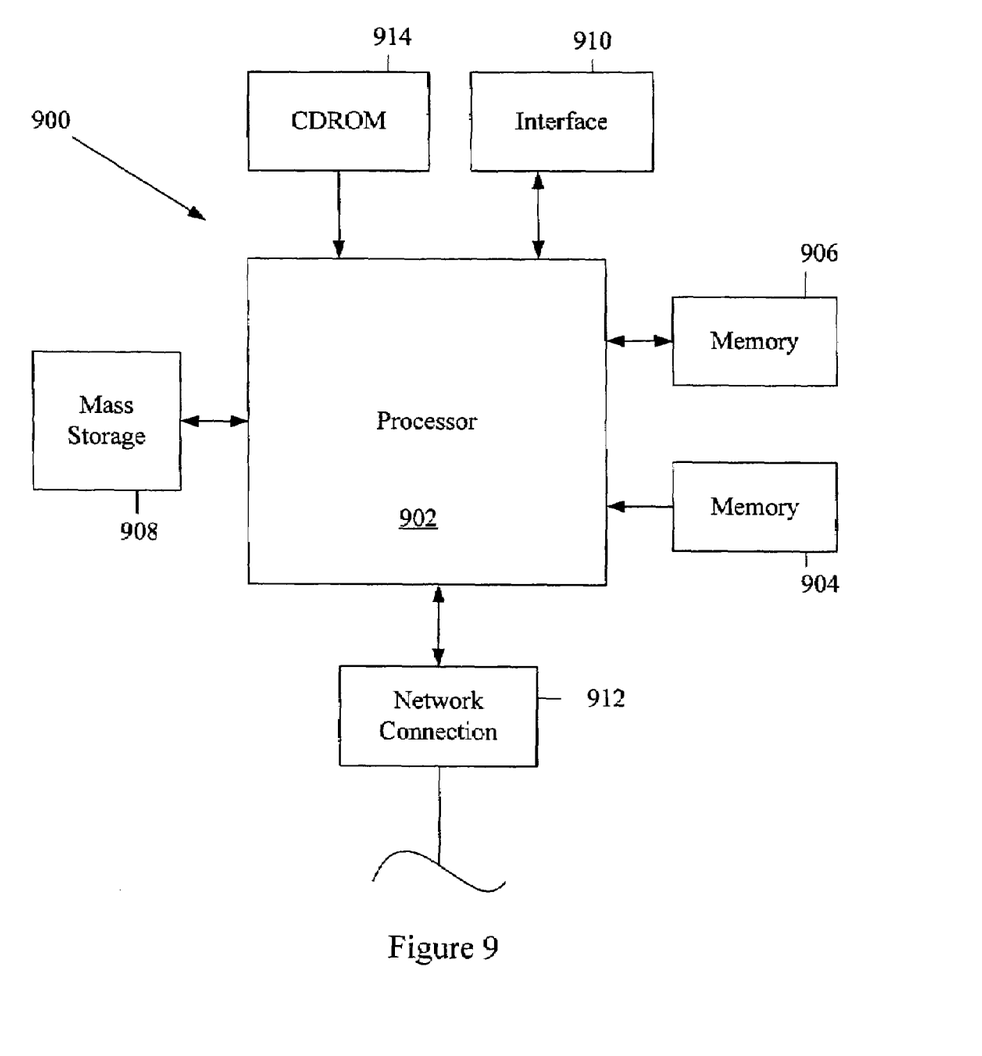
FIG. 9 is a diagrammatic representation of a system that can be used to implement the programmable chip.

FIG. 9 illustrates a typical computer system that can be used to implement a programmable chip having shared I/O lines. The computer system 900 includes any number of processors 902 (also referred to as central processing units, or CPUs) that are coupled to devices including memory 906 (typically a random access memory, or "RAM"), memory 904 (typically a read only memory, or "ROM"). The processors 902 can be configured to generate a test sequences for any designated processor. As is well known in the art, memory 904 acts to transfer data and instructions unidirectionally to the CPU and memory 906 is used typically to transfer data and instructions in a bi-directional manner.

Both of these memory devices may include any suitable type of the computer-readable media described above. A mass storage device 908 is also coupled bi-directionally to CPU 902 and provides additional data storage capacity and may include any of the computer-readable media described above. The mass storage device 908 may be used to store programs, data and the like and is typically a secondary storage medium such as a hard disk that is slower than memory. The mass storage device 908 can be used to hold a library or database of prepackaged logic or intellectual property functions, as well as information on generating particular configurations. It will be appreciated that the information retained within the mass storage device 908, may, in appropriate cases, be incorporated in standard fashion as part of memory 906 as virtual memory. A specific mass storage device such as a CD-ROM 914 may also pass data uni-directionally to the CPU.

CPU 902 is also coupled to an interface 910 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 902 optionally may be coupled to a computer or telecommunications network using a network connection as shown generally at 912. With such a network connection, it is contemplated that the CPU might receive information from the network, or might output information to the network in the course of performing the above-described method steps. It should be noted that the system 900 may also be associated with devices for transferring completed designs onto a programmable chip. The above-described devices and materials will be familiar to those of skill in the computer hardware and software arts.

The hardware elements described above may be configured (usually temporarily) to act as multiple software modules for performing the operations of this invention. For example, instructions for running a generator program, input stage (e.g., a wizard), and/or compiler may be stored on mass storage device 908 or 914 and executed on CPU 908 in conjunction with primary memory 906.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of primary and secondary components and should not be restricted to the ones mentioned above. Although shared I/O lines have been described in the context of a memory controller and a simultaneous multiple primary component switch fabric, shared I/O lines can be used in a system without a memory controller and/or without a simultaneous multiple primary component switch fabric. It is therefore intended that the invention be interpreted to include all variations and equivalents that fall within the true spirit and scope of the present invention.

What is claimed is:

1. A system on a programmable chip, the system comprising:
    a processor core;
    a memory controller coupled to the processor core, the memory controller having a plurality of I/O lines including data, address, and control lines, the I/O lines operable to allow the processor to access off-chip tristate devices, wherein the memory controller is user configurable to either use separate sets of I/O lines for accessing off-chip tristate devices or to share one or more I/O lines for accessing off-chip tristate devices.

2. The system of claim 1, wherein one or more I/O lines shared include data and address lines.

3. The system of claim 1, wherein separate control lines are maintained even when the same set of data and address lines are shared between separate off-chip tristate devices.

4. The system of claim 3, wherein the processor is a state machine.

5. The system of claim 3, wherein the memory controller is configured automatically using a graphical configuration tool.

6. The system of claim 1, wherein I/O lines further comprise datamask lines.

7. The system of claim 1, wherein the tristate devices include SDRAM and SRAM.

8. The system of claim 7, wherein SDRAM is arranged as multiple banks of memory with independent row address management.

9. The system of claim 8, wherein the memory controller automatically maintains control of a particular SDRAM as long as back-to-back read or write transactions within the same row and bank persist.

10. The system of claim 9, wherein a break in back-to-back transactions closes a row and allows access to other tristate devices.

11. The system of claim 1, further comprising a simultaneous multiple primary component fabric coupling the processor core to the memory controller.

12. The system of claim 11, wherein the simultaneous multiple primary component fabric allows a primary component to access a secondary component while a separate primary component is accessing a separate se component.

13. The system of claim 12, wherein the simultaneous multiple primary component fibric comprises multiplexer coupled to the memory controller, the multiplexer operable to allow a single primary component to access the memory controller at a given time.

14. The system of claim 1, further comprising a Parallel I/O peripheral, timer, and a UART coupled to a multiple primary component fabric.

15. The system of claim 1, wherein I/O lines comprise address, data, mask, and control buses.

16. The system of claim 1, wherein the memory controller includes logic selecting one of a plurality of off-chip tristate devices for access.

17. A method for configuring a programmable chip, the method comprising:
    receiving information identifying a memory controller, the memory controller associated with a processor core;
    identifying a plurality of off-chip tristate devices;
    receiving user configuration information through an interface to use separate sets of I/O lines or to share one or more I/O lines for accessing the off-chip tristate devices;
    generating the plurality of I/O lines including data, address, and control lines to couple the memory controller with the plurality of off-chip tristate devices.

18. The method of claim 17, wherein one or more I/O lines shared include data and address lines.

19. The method of claim 17, wherein separate control lines are maintained even when the same set of data and address lines are shared between separate off-chip tristate devices.

20. The method of claim 19, wherein the processor is a state machine.

21. The method of claim 19, wherein the memory controller is configured automatically using a graphical configuration tool.

22. The method of claim 17, wherein I/O lines further comprise datamask lines.

23. The method of claim 17, wherein the tristate devices include SDRAM and SRAM.

24. The method of claim 23, wherein SDRAM is arranged as multiple banks of memory with independent row address management.

25. The method of claim 24, wherein the memory controller automatically maintains control of a particular SDRAM as long as back-to-back read or write transactions within the same row and bank persist.

26. The method of claim 25, wherein a break in back-to-back transactions closes a row and allows access to other tristate devices.

27. The method of claim 17, further comprising a simultaneous multiple primary component fabric coupling the processor core to the memory controller.

28. The method of claim 27, wherein the simultaneous multiple primary component fabric allows a primary component to access a secondary component while a separate primary component is accessing a separate secondary component.

29. The method of claim 28, wherein the simultaneous multiple primary component fabric comprises multiplexer coupled to the memory controller, the multiplexer operable to allow a single primary component to access the memory controller at a given time.

30. An apparatus for configuring a programmable chip, the apparatus comprising:

means for receiving information identifying a memory controller, the memory controller associated with a processor core;

means for identifying a plurality of off-chip tristate devices;

means for receiving user configuration information through an interface to use separate sets of I/O lines or to share one or more I/O lines for accessing the off-chip tristate devices;

means for generating the plurality of I/O lines including data, address, and control lines to couple the memory controller with the plurality of off-chip tristate devices.

* * * * *